(12) United States Patent
Robinson et al.

(10) Patent No.: US 7,323,035 B2
(45) Date of Patent: Jan. 29, 2008

(54) DEHUMIDIFYING DEVICE

(75) Inventors: Paul William Robinson, Hull (GB); Richard Paul Harbutt, Rowly (GB); David Bedford, Hull (GB)

(73) Assignee: Reckitt Benckiser (UK) Limited, Slough, Berkshire (GB)

( * ) Notice: Subject to any disclaimer, the term of this patent is extended or adjusted under 35 U.S.C. 154(b) by 322 days.

(21) Appl. No.: 10/512,524

(22) PCT Filed: May 1, 2003

(86) PCT No.: PCT/GB03/01853

§ 371 (c)(1),
(2), (4) Date: May 11, 2005

(87) PCT Pub. No.: WO03/092864

PCT Pub. Date: Nov. 13, 2003

(65) Prior Publication Data

US 2005/0217486 A1    Oct. 6, 2005

(30) Foreign Application Priority Data

May 4, 2002    (GB) ................................ 0210296.0

(51) Int. Cl.
*B01D 53/26*    (2006.01)
(52) U.S. Cl. ........................... 95/91; 96/117.5; 96/118; 96/119; 34/80
(58) Field of Classification Search .............. 95/91, 95/117; 96/117.5, 118, 119, 417; 34/329, 34/DIG. 1, 80, 95; 252/194
See application file for complete search history.

(56) References Cited

U.S. PATENT DOCUMENTS

| 2,341,893 | A | * | 2/1944 | Baker | ......................... | 96/119 |
| 2,554,879 | A | * | 5/1951 | Race, Jr. | ..................... | 96/117.5 |
| 2,621,753 | A | * | 12/1952 | Urdahl | ...................... | 96/117.5 |
| 3,705,480 | A | * | 12/1972 | Wireman | .................... | 96/117.5 |
| 4,319,679 | A | * | 3/1982 | Gustafsson | ................. | 206/0.5 |
| 4,927,436 | A | * | 5/1990 | Glienke | ....................... | 96/119 |
| 5,593,477 | A | * | 1/1997 | Elson | ......................... | 96/117.5 |
| 6,423,122 | B1 | * | 7/2002 | Kelders | ....................... | 96/119 |

FOREIGN PATENT DOCUMENTS

JP    A-07328371    12/1995

OTHER PUBLICATIONS

Blue Silica Gel, Internet Document, http://www.bikudo.com/product_search/details/14466/blue_silica_gel.html, May 2007.*
International Search Report dated Oct. 7, 2003 for Application PCT/GB03/01853.

(Continued)

*Primary Examiner*—Frank M. Lawrence

(57) ABSTRACT

A dehumidifying device for absorbing water vapour from ambient air comprising a container having an opening to permit water vapour to enter the container, the container having a water-absorbing agent disposed therein for absorbing water vapour, wherein a first portion of the water-absorbing agent is adapted to provide an indication of water absorption faster than a second portion of the water-absorbing agent following exposure of the first and second portions of water-absorbing agents to water vapour, thereby providing an early indication of the operation of the device.

17 Claims, 2 Drawing Sheets

OTHER PUBLICATIONS

Derwent Record JP2001239126A2; Assignee: Fumakila LL Standard company; Accession/Update: 2002-057865/200208.

Derwent Record JP08206440A2; Assignee: Hakugen Co Ltd Non-standard company; Accession/Update: 1996-420264/199904.

Derwent Record JP07328371A2; Assignee: Hakugen Co Ltd Non-standard company; Accession/Update: 1996-072935/199843.

International Preliminary Examination Report dated May 28, 2004 for Application No. PCT/GB03/01853.

* cited by examiner

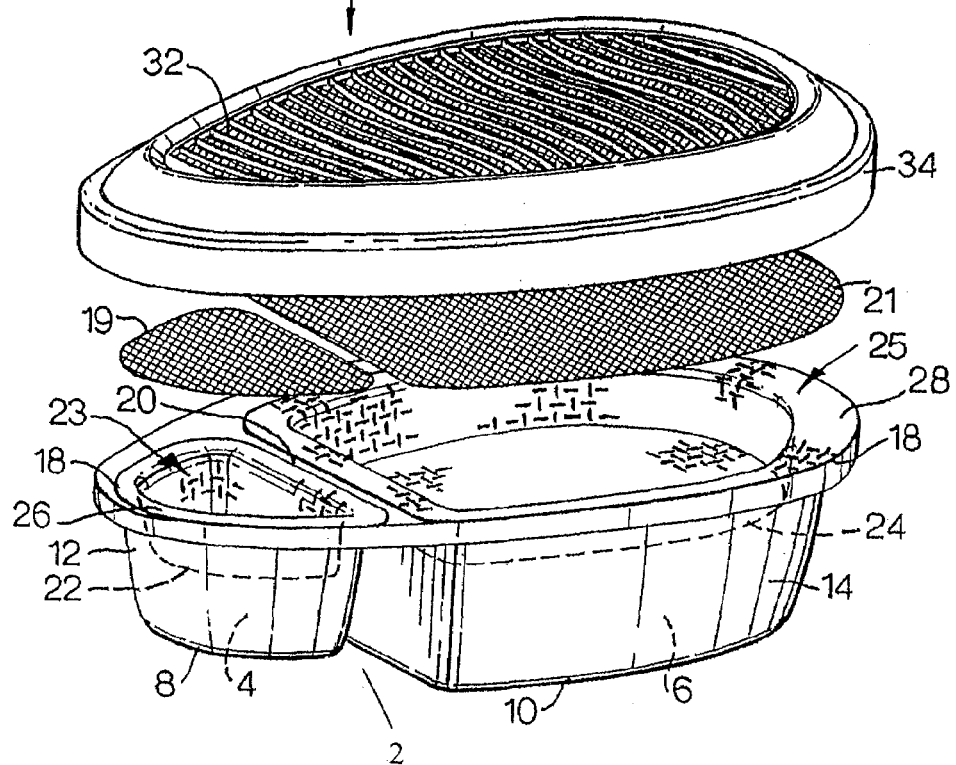
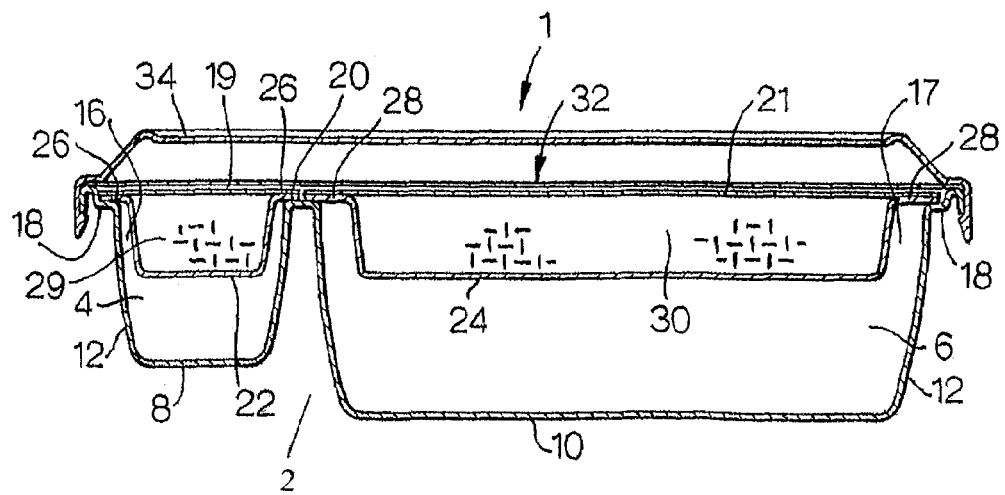

DEHUMIDIFYING DEVICE

FIELD OF THE INVENTION

The present invention relates to a device for absorbing water vapour. Particularly, although not exclusively, it relates to a device for dehumidifying air in a confined or limited space; and to associated methods.

BACKGROUND OF THE INVENTION

Humidity, or water vapour in air, is often undesirable as it may interfere with the storage of moisture sensitive materials, such as foodstuffs, cosmetics, pharmaceuticals, household goods and clothes, or it may adversely effect the operation of moisture sensitive equipment. This problem may be particularly pronounced in those areas where humidity levels are particularly high, such as those countries having hot humid climates.

It is therefore often desirable to dehumidify air. Traditional methods for dehumidifying air include the use of mechanical refrigeration equipment and water absorbent materials, such as silica gel.

Typically, methods employing refrigeration equipment involve cooling air to a predetermined temperature below its dew point, so that water condenses from the air and the water may be drained away. Thereafter, the air may be reheated to a predetermined warmer temperature. Techniques including absorbent materials may include continuous operation systems so that water is absorbed by the absorbent in a first cycle and then water desorbed from the absorbent by the application of heat in a second cycle.

Suitably, these techniques suffer from various disadvantages as they typically require bulky and heavy equipment, such as compressors, fans and heaters, which are interconnected by a network of pipes so that water vapour is absorbed continuously from air. Typically, such systems are ill-suited for operation in a confined or limited space. Moreover, the cost associated with such systems may prohibit their use in a domestic environment.

In an attempt to overcome the disadvantages associated with using the aforementioned systems in a confined or limited space, alternative techniques have been developed that include exposing air to an absorbent material. In particular, portable smaller devices comprising a container housing an absorbent material have been employed for dehumidifying air in a limited or confined space, particularly in a domestic environment.

Although absorbents such as silica gel may be employed in these devices, typically silica gel only absorbs up to 30% its weight of water and it is necessary to employ an absorbent having a higher capacity for water vapour absorption to prolong the life and improve the efficiency of the device. Suitably, hygroscopic deliquescent agents, such as calcium chloride, which may absorb 4 to 5 times its weight of water, have been employed in such devices. Upon prolonged exposure to water vapour, typically in the order of days, the degree of saturation of the deliquescent agent increases and the deliquescent agent forms a liquid of gel, and is such that liquid seeps from it. Typically, the deliquescent agent is placed on a perforate shelf in the container so that the liquid drips into a region of the base of the container, thereby providing an indication that the container is functioning satisfactorily.

Although these devices have gone some way to solving the problems associated with absorbing water vapour in a confined space, particularly in a domestic environment, a major disadvantage with these devices, particularly those employing a deliquescent agent, is that they only provide the user with an indication that the device is functioning satisfactorily after it has been placed in a humid environment for prolonged periods of time. Typically, these devices do not provide the user with an early indication that the device is functioning satisfactorily shortly after being placed in a humid environment, because it typically takes a number of days before the deliquescent agent reaches a level of saturation to form a liquid or gel.

SUMMARY OF THE INVENTION

The present invention seeks to solve the aforementioned problems associated with the efficient absorption of water vapour, in particular, absorption of water vapour from air in a confined space, particularly in a domestic environment.

According to a first aspect the present invention provides a dehumidifying device for absorbing water vapour from ambient air comprising a container having an opening to permit water vapour to enter the container, the container having a water-absorbing agent disposed therein for absorbing water vapour, wherein a first portion of the water-absorbing agent is adapted to provide an indication of water absorption faster than a second, separate, portion of the water-absorbing agent following exposure of the first and second portions of water-absorbing agents to water vapour, thereby providing an early indication of the operation of the device.

Conveniently, the dehumidifying device includes two portions of a water-absorbing agent which, when exposed to water vapour, provide an indication of water absorption at different rates thereby providing an early indication that the device is functioning satisfactorily and maintaining the environment in which it is placed at an acceptable humidity level.

Preferably, the first portion of the water-absorbing agent is a deliquescent agent that forms a liquid or gel on absorption of water vapour, preferably such that liquid seeps from it, thereby providing an early indication of the operation of the device.

Preferably, the second portion of the water-absorbing agent is a deliquescent agent that forms a liquid or gel on absorption of water vapour, preferably such that liquid seeps from it, thereby providing a later indication of the operation of the device.

Most preferably, both the first and second portions of the water-absorbing agent are deliquescent agents. Conveniently, the first portion of deliquescent agent provides an early indication of the operation of the device and the second portion of deliquescent agent provides a later indication of the further operation of the device following placement of the device in a humid environment for a prolonged time.

Preferred deliquescent agents include calcium chloride and magnesium chloride as these not only exhibit an acceptable water absorption capacity but they are relatively non-caustic which render them suitable for use in devices that may be placed in a domestic environment. This does not exclude other deliquescent salts, for example when intended for use in other environments, for example industrial environments One preferred water-absorbing agent is calcium chloride alone. Another is magnesium chloride. Especially preferred is calcium chloride providing up to 20 wt % of the total content and the balance comprising a different water-absorbing agent, preferably magnesium chloride.

Suitably, the water-absorbing agent as defined herein may include other components selected from a binder or thickener, for example starch, a pest control agent, a perfume, and odour absorbing agent (for example a zeolite), an antimicrobial agent, and combinations thereof. Preferably, when the water-absorbing agent comprises a deliquescent agent then an antimicrobial agent is included to prevent microbe formation in liquid formed by dissolution of the deliquescent agent.

Preferably, the first portion of the water-absorbing agent is adapted to provide an indication of water absorption in greater than or equal to 12 hours, more preferably greater than or equal to 18 hours, even more preferably greater than or equal to 24 hours, even more preferably greater than or equal to 36 hours, most preferably greater than or equal to 48 hours following exposure to water vapour.

By the term "provide an indication of water absorption" we mean the time when the water-absorbing agent has absorbed sufficient water vapour so that it provides an indication of the operation of the device. For example, when the first and/or second portions of water-absorbing agent comprise a deliquescent agent, we mean the respective times when each portion of deliquescent agent has absorbed sufficient water vapour to generate a liquid or gel, preferably so that liquid seeps from it, thereby providing an indication of the operation of the device.

Preferably, the second portion of water-absorbing agent is adapted to reach saturation in greater than or equal to 2 days, more preferably greater than or equal to 3 days, even more preferably greater than or equal to 5 days, most preferably greater than or equal to 7 days following exposure to water vapour.

It will be appreciated that when the first and second portions of water-absorbing agents "provide an indication of water absorption" as defined herein, the first and second portions of water-absorbing agent may still continue to absorb water vapour from the environment.

Preferably, the first portion of water-absorbing agent is adapted to provide an indication of water absorption at a rate of greater than or equal to 2 times, more preferably greater than or equal to 3 times, most preferably greater than or equal to 5 times the rate at which the second portion of water-absorbing agent is adapted to provide an indication of water absorption, following exposure of the first and second portions of water-absorbing agents to the same level of water vapour.

Preferably, the second portion of water-absorbing agent is adapted to provide an indication of water absorption following exposure to water vapour at substantially the same time as when the first portion of water-absorbing agent is exhausted. For example, when the first and second portions of water-absorbing agent comprise deliquescent agents, the time when the second portion has absorbed sufficient water vapour to generate a liquid or gel, preferably so that liquid seeps from it, corresponds substantially to the same time when the first portion has absorbed its maximum capacity of water vapour. Conveniently, in this preferred embodiment of the present invention, the first and second portions of water-absorbing agent respectively provide an early indication and a continuous further indication of the operation of the device when placed in a humid environment.

Preferably, the mass of the first portion of water-absorbing agent is less than the mass of the second portion of water absorbing agent. Conveniently, the composition of the first and second water-absorbing agents may be substantially identical.

Preferably, the first portion of water-absorbing agent is partially or fully pre-saturated prior to exposure to water vapour.

By the term "pre-saturated" we mean that the first portion of water-absorbing agent includes moisture so that it reaches saturation faster than the same mass of an identical anhydrous water-absorbing agent when both the pre-saturated and anhydrous water-absorbing agents are exposed to the same level of water vapour. Conveniently, when the first portion of water-absorbing agent is partially or fully pre-saturated prior to exposure to water vapour, the composition of the first and second water-absorbing agents of the container of the present invention may be substantially identical.

Preferably, the first portion of water-absorbing agent is partially or fully pre-saturated prior to exposure to water vapour so that it reaches saturation at a rate of greater than or equal to 2 times, more preferably greater than or equal to 3 times, most preferably greater than or equal to 5 times the rate at which the same mass of an identical anhydrous water-absorbing agent reaches saturation following exposure of both the pre-saturated and anhydrous water-absorbing agents to the same level of water vapour.

As mentioned hereinbefore, the composition of the first and second portions of water-absorbing agents may be substantially identical. Suitably, when the water-absorbing agent comprises a deliquescent agent as defined herein the first and second portions of the water-absorbing agent may comprise the same deliquescent agent, for example calcium chloride or magnesium chloride.

Alternatively, the composition of the first and second portions of the water-absorbing agent may be different. Conveniently, the compositions of the first and second portions of water-absorbing agent may be chosen so that the first portion of water-absorbing agent provides an indication of water absorption faster than the second portion of water-absorbing agent. Suitably, when the water-absorbing agent comprises a deliquescent agent as defined herein, the first portion of water-absorbing agent may comprise magnesium chloride and the second portion of water-absorbing agent may comprise calcium chloride.

Preferably, the first portion of water-absorbing agent is disposed on a shelf positioned above the base of the container. Preferably, the second portion of water-absorbing agent is disposed on a shelf positioned above the base of the container. More preferably, both of the first and second potions of water-absorbing agent are disposed on a shelf positioned above the base of the container. Most preferably, the shelf comprises a perforate shelf. Conveniently, the use of a perforate shelf permits liquid to seep from the first and/or second portions of water-absorbing agent (e.g. deliquescent agent) into a region of the base of the container.

As mentioned above the first portion of water-absorbing agent is separate from the second portion of water-absorbing agent. By the term "separate" we mean that the first portion of water-absorbing agent is not in physical contact with the second portion of water-absorbing agent. In other words, the second portion of water-absorbing agent, for example is not coated with the first portion of water-absorbing agent, and vice versa.

Suitably the first and second portions of water-absorbing agent are located at different positions in the container. Preferably, the first and second portions of water-absorbing agent are located at different positions on the shelf as defined herein.

Preferably, the shelf defines a first shelf portion having the first portion of water-absorbing agent disposed thereon and a second separate shelf portion having the second portion of water-absorbing agent disposed thereon.

Conveniently, the dehumidifying device may include a single shelf defining the first and second separate shelf portions. Alternatively, the dehumidifying device may include two separate shelves.

Suitably, when the shelf defines a first and second shelf portion; the first shelf portion is perforate. Suitably, when the shelf defines a first and second shelf portion, the second shelf portion is perforate. Preferably, both the first and second shelf portions are perforate.

Preferably, when the dehumidifying device comprises two separate shelf portions the container comprises two separate reservoirs: a first reservoir for receiving the first shelf portion; and, a second reservoir for receiving the second shelf portion. Conveniently, such an arrangement may allow the container to be dimensioned so that the early indication of the operation of the device is more visible to the user. Moreover, such an arrangement may prevent mixing of liquids formed from the first and second portions of water-absorbing agent upon absorption of water vapour. This may be desirable to prevent adverse reactions between liquids formed from the respective water-absorbing agents, particularly when the composition of the first and second portions of water-absorbing agent are different.

Conveniently, when the dehumidifying device comprises two separate perforate shelf portions, a first reservoir for receiving the first perforate shelf portion and a separate second reservoir for receiving the second perforate shelf portion, such an arrangement may permit liquid to seep from the first and second portions of water-absorbing agent into separate regions of the base of the container.

Preferably, the shelf extends between the side wall(s) of the container. Conveniently, where the shelf includes a first and second shelf portion, the first shelf portion extends between the side walls(s) of the first reservoir and the second shelf portion extends between the side wall(s) of the second reservoir.

In a particularly preferred embodiment of the present invention the container comprises two separate reservoirs as defined above, wherein the first reservoir for receiving the first shelf portion is not in fluid communication with the second reservoir for receiving the second shelf portion. Conveniently, such an arrangement may not only prevent mixing of liquids formed from the first and second portions of water absorbing agent upon absorption of water vapour but also may prevent transfer of water vapour from the first to second portion of water-absorbing agent, and vice-versa, thereby restricting, preferably preventing, equilibration of the degree of saturation between the first and second portions of water-absorbing agent. Consequently, this arrangement may further ensure that the first portion of water-absorbing agent provides an indication of water absorption before the second portion of water-absorbing agent.

Suitably, when the shelf comprises a perforate shelf, the openings in the perforate shelf, and first and second shelf portions when present, are dimensioned to allow liquid to drip from the first and second portions of water-absorbing agent.

The openings may be of any shape and of any size which allows for good passage of liquid, but retention of the water-absorbing material on the shelf. Suitable shapes include circles, squares and slits.

Typically, the openings as defined above have a minimum width of 0.1 mm to 2 mm.

Preferably, the container opening is covered with a vapour-permeable liquid-impermeable membrane to permit water vapour to enter the container and prevent liquid from exiting the container. Suitably, when the container includes a first and second reservoir as defined herein, the opening of the first reservoir may be covered with a first vapour-permeable liquid-impermeable membrane and the opening of the second reservoir may be covered by a second separate vapour-permeable liquid-impermeable membrane. Alternatively, the openings of the first and second reservoirs may be covered with a single vapour-permeable liquid-impermeable membrane. Suitable membranes are well known to those skilled in the art, such as polytetrafluoroethylene (PTFE) membranes available from W L Gore and Associates Inc., or polyolefin films available under the trade mark TYVEK, or polyurethane films. The vapour-permeable liquid-impermeable membrane not only permits the container of the present invention to function satisfactorily but also prevents spillage of liquid from the container formed by dissolution of the water-absorbing agent, when a deliquescent agent is used.

Unexpectedly, we have found that the rate of absorption of water vapour by the water-absorbing agent may be increased when the water-absorbing agent is in contact with the vapour-permeable liquid-impermeable membrane. Thus, according to a preferred embodiment of the present invention, the first portion of water-absorbing agent and/or the second portion of water-absorbing agent contacts the vapour-permeable liquid-impermeable membrane. More preferably, both the first and second portions of water-absorbing agent contact the vapour-permeable liquid-impermeable membrane.

Preferably, the membrane is immovably secured across the opening of the container to prevent a user accessing the interior of the container and contacting the water-absorbing agent, thereby improving the safety rating of the container.

Preferably, a membrane used in the present invention is of a type which provides moisture transmission of at least 1000 g, preferably at least 5000 g, and most preferably at least 10000 g water/m$^2$ through the membrane/day.

Suitably, the inlet of the container includes a removable fluid tight seal so that it may be stored without degradation of the water-absorbing agent. Suitably, the fluid tight seal extends across the semi-permeable membrane.

Preferably, the container further includes an outlet having a resealable fluid tight seal to permit drainage of liquid from the container and/or to permit water-absorbing agent to be added to the container. Conveniently, this enables the container of the present invention to be re-used thereby decreasing the amount of expenditure required when it is necessary to replace an exhausted device with a new one.

Suitably, the dehumidifying device of the present invention is dimensioned so that it may be used in a confined space, particularly a confined space in a domestic environment, such as a drawer, chest, wardrobe, cupboard, packing case, refrigerator, freezer, cool box, caravan, car, car boot or boat. Suitably, the container of the present invention is 5 to 30 cm high, 10 to 50 cm long, and 5 to 30 cm wide. Typically, the device includes 50-1000 g of water-absorbing agent, preferably 100-500 g.

Suitably, the container is rigid or flexible. Most preferably, the container is rigid.

Preferably, the container and the shelf are formed from a plastics material, for example a polyolefin, by techniques well known to those skilled in the art such as injection moulding, blow moulding and vacuum forming.

According to a further aspect, the present invention provides a method for removing water vapour from a locus, preferably an enclosed locus, comprising locating a dehumidifying device as described herein in the locus.

BRIEF DESCRIPTION OF THE DRAWINGS

The present invention will now be illustrated by way of the following non-limiting examples, in which:

FIG. 3 is a perspective view of the component parts of the dehumidifying device of FIG. 1; and FIG. 4 is a cross-sectional view of the dehumidifying device of FIG. 1.

DETAILED DESCRIPTION OF THE DRAWINGS

Figure 1:
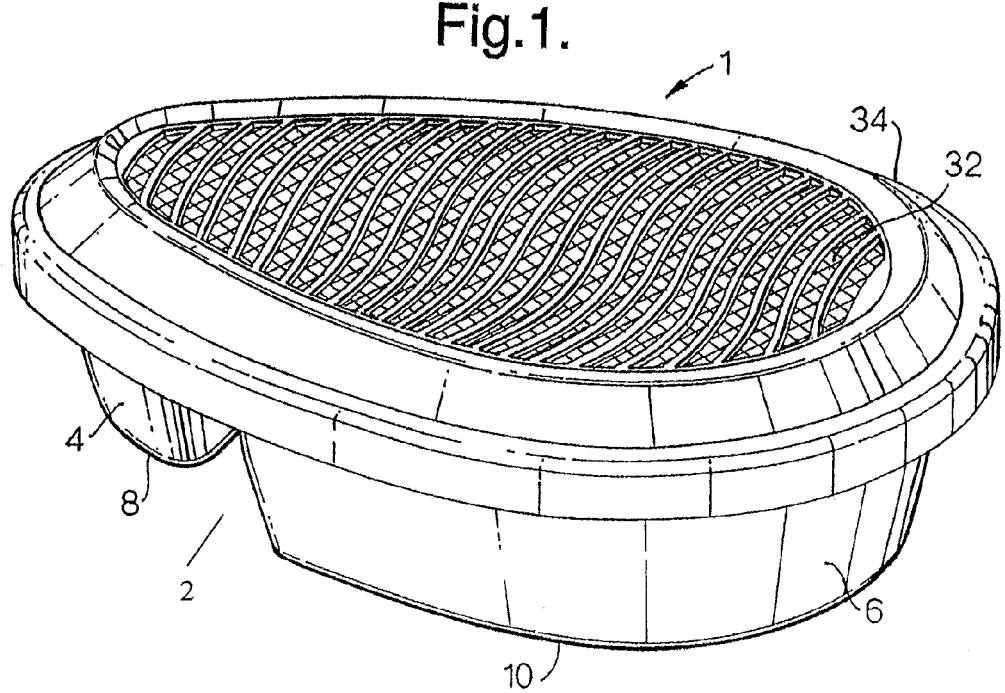
FIG. 1 is a perspective view of a dehumidifying device of the present invention.
Figure 2:
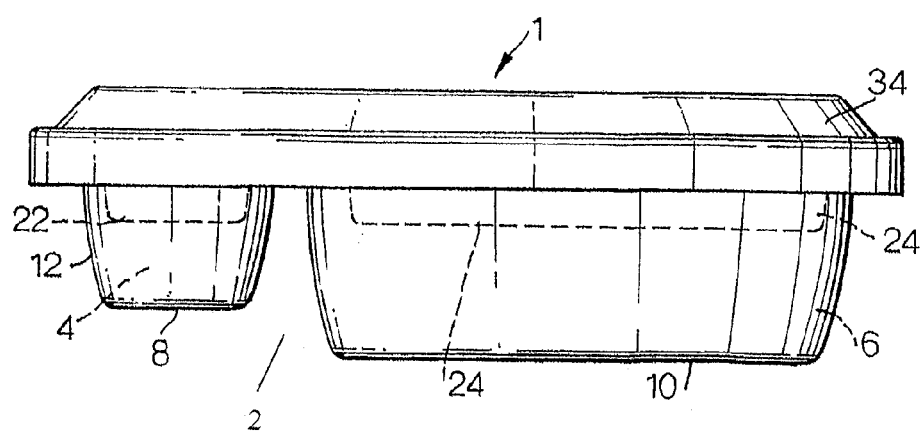
FIG. 2 is a side view of the dehumidifying device of FIG. 1.

The dehumidifying device (1) of FIGS. 1 to 4 comprises a container (2) formed by injection moulding having integral first (4) and second (6) separate reservoirs. The first (4) and second (6) reservoirs have an arched-shaped base (8, 10) and separate side walls (12, 14) extending upwardly from the respective bases (8, 10) to define separate openings (16, 17) at the upper end of the first and second reservoir, respectively. The upper end of side walls (12, 14) terminate in an annular rim (18) that extends around the openings (16, 17). The first smaller reservoir (4) of the container (2) is separated from the second larger reservoir (6) by interior dividing wall (20) extending across container (2). A first vapour-permeable liquid-impermeable membrane (19) comprised of TYVEK material (Trade Mark; HDPE material from DuPont) is heat-sealed to rim (18) so that it extends across and covers opening (16). A second vapour-permeable liquid-impermeable membrane (21) comprised of TYVEK material is heat sealed to rim (18) and dividing wall (2) so that it extends across and covers opening (17). Suitably, the first (4) and second (6) reservoirs are not in fluid communication with each other.

The interior of the first (4) and second reservoirs (6) of the container (2) include a first (22) and second (24) perforate shelf, respectively, formed from translucent HDPE. The first shelf includes a perforate container (23) having a lip (26) that rests on rim (18) and dividing wall (20). The second shelf includes a perforate container (25) having a lip (28) that rests on rim (18) and dividing wall (20). A plurality of circular holes (not shown) of diameter 1 mm pass through each shelf (22, 24). The first smaller shelf supports a pre-saturated magnesium chloride water-absorbing agent (29). The second larger shelf supports an anhydrous calcium chloride water-absorbing agent (30).

The first (19) and second (21) vapour-permeable liquid-impermeable membranes are covered by a perforate liquid-permeable plastic net (32). The plastic net (32) is covered by a perforate lid (34) that snap-fits over rim (18) of the container (2).

The operation of the container shown in FIGS. 1 to 4 is simple. After purchase the user removes an impermeable plastics cover (not shown). This is provided during manufacture in order to maintain the water-absorbing material in a substantially desiccated condition, prior to the commencement of use. The user places the container on a level surface in an air space in which reduction of humidity is desired.

Water vapour is absorbed by both the magnesium chloride and calcium chloride water-absorbing agents. The magnesium chloride water-absorbing agent absorbs sufficient water vapour after approximately 24 hours and forms a gel so that liquid seeps from the magnesium chloride water-absorbing agent through the shelf (22) and into reservoir (4), thereby providing an early indication that the device (1) is functioning satisfactorily and maintaining the environment at an acceptable humidity level. After approximately 2 days the magnesium chloride water-absorbing agent is exhausted and at substantially the same time the calcium chloride water-absorbing agent has absorbed sufficient water vapour such that gel and liquid seeps from it through the shelf (24) and into reservoir (6), thereby providing a further indication that the container is still operating satisfactorily. When the calcium chloride water-absorbing agent is exhausted, the liquid dripping through shelf (26) stops thereby providing an indication that the device needs to be replaced.

The invention claimed is:

1. A dehumidifying device for absorbing water vapour from ambient air comprising a container having an opening to permit water vapour to enter the container, the container having a water-absorbing agent disposed therein for absorbing water vapour, wherein a first portion of the water-absorbing agent comprises a deliquescent agent and is adapted to provide an indication of water absorption faster than a second, separate, portion of the water-absorbing agent following exposure of the first and second portions of water-absorbing agents to water vapour, thereby providing an early indication of the operation of the device.

2. A dehumidifying device according to claim 1 wherein the second portion of the water-absorbing agent is a deliquescent agent.

3. A dehumidifying device according to claim 2 wherein the or each deliquescent agent forms a liquid or gel on absorption of water vapour, thereby providing an indication of the operation of the device.

4. A dehumidifying device according to claim 1 wherein the first portion of water-absorbing agent is adapted to provide an indication of water absorption in greater than or equal to 12 hours following exposure to water vapour.

5. A dehumidifying device according to claim 1 wherein the mass of the first portion of water-absorbing agent is less than the mass of the second portion of water-absorbing agent.

6. A dehumidifying device according to claim 1 wherein the first portion of water-absorbing agent is partially pre-saturated.

7. A dehumidifying device according to claim 1 wherein the first and second portions of water-absorbing agent comprise calcium chloride.

8. A dehumidifying device according to claim 1 wherein the composition of the first portion of water-absorbing agent is different from the composition of the second portion of water-absorbing agent.

9. A dehumidifying device according to claim 8 wherein the first portion of water-absorbing agent comprises magnesium chloride.

10. A dehumidifying device according to claim 8 wherein the second portion of water-absorbing agent comprises calcium chloride.

11. A dehumidifying device according to claim 1 wherein the first and second portions of water-absorbing agent are disposed on a shelf positioned above the base of the container.

12. A dehumidifying device according to claim 11 wherein the shelf is perforate.

13. A dehumidifying device according to claim 11 wherein the shelf defines two separate shelf portions, a first shelf portion having the first portion of water-absorbing agent disposed thereon and a second separate shelf portion having the second portion of water-absorbing agent disposed thereon.

14. A dehumidifying device according to claim 13 wherein the container comprises two separate reservoirs, a first reservoir for receiving the first shelf portion and a second separate reservoir for receiving the second shelf portion.

15. A dehumidifying device according to claim 14 wherein the first reservoir is not in fluid communication with the second reservoir.

16. A dehumidifying device according to claim 1 wherein the opening of the container is covered with a semi-permeable membrane.

17. A method for removing water vapour from a locus, comprising locating a dehumidifying device according to claim 1 in the locus.

* * * * *